(12) United States Patent
Pujari et al.

(10) Patent No.: US 9,230,281 B2
(45) Date of Patent: Jan. 5, 2016

(54) TRANSACTION SERVICES REPORTING SYSTEM

(75) Inventors: Sushant K. Pujari, Yorktown Heights, NY (US); Sean Kane, Jackson, MI (US); Gregory Cleary, Dayton, OH (US); Manh Nguyen, Annandale, VA (US); Brian P. Theado, Canal Winchester, OH (US); Khoa N. Nguyen, Westerville, OH (US); Lloyd S. Palmer, Jr., Hilliard, OH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 803 days.

(21) Appl. No.: 13/332,518

(22) Filed: Dec. 21, 2011

(65) Prior Publication Data
US 2013/0167047 A1 Jun. 27, 2013

(51) Int. Cl.
*G06F 3/048* (2013.01)
*G06Q 40/02* (2012.01)

(52) U.S. Cl.
CPC ............... *G06Q 40/02* (2013.01); *G06F 3/048* (2013.01)

(58) Field of Classification Search
CPC .............................. G06F 3/3048; G06Q 40/02
USPC .................................. 715/764, 762; 707/769
See application file for complete search history.

(56) References Cited

U.S. PATENT DOCUMENTS

| | | | |
|---|---|---|---|
| 8,332,294 B1* | 12/2012 | Thearling | 705/35 |
| 2002/0046057 A1* | 4/2002 | Ross | 705/1 |
| 2004/0254927 A1* | 12/2004 | Lang et al. | 707/5 |
| 2005/0183143 A1* | 8/2005 | Anderholm et al. | 726/22 |
| 2006/0129499 A1* | 6/2006 | Combar et al. | 705/64 |
| 2007/0192128 A1* | 8/2007 | Celestini | 705/1 |
| 2007/0226228 A1* | 9/2007 | Her et al. | 707/10 |
| 2010/0169216 A1* | 7/2010 | Smith et al. | 705/44 |
| 2012/0101952 A1* | 4/2012 | Raleigh et al. | 705/304 |

\* cited by examiner

*Primary Examiner* — Ajay Bhatia
*Assistant Examiner* — Phuong Nguyen

(57) ABSTRACT

One or more devices within a transaction services hub collect session data of transaction services for multiple customers and provide a user interface with reporting options for transaction services associated with a particular customer. The user interface is accessible to a user device via a public network connection. The one or more devices receive a report request from a user account associated with the particular customer and retrieve, from the collected session data, data responsive to the report request. The one or more devices generate a report for the particular customer based on the report request and the data responsive to the report request.

20 Claims, 15 Drawing Sheets

US 9,230,281 B2

TRANSACTION SERVICES REPORTING SYSTEM

BACKGROUND

Transaction services may generally include data communications over a network to support a secure transaction. Transaction services may be characterized by short sessions to support inquiry-and-response applications. Transaction applications may include, for example, credit/debit card authorization, automated teller machine (ATM) activity, insurance verification, and home health monitoring. Customers of transaction services may include payment processing entities, which can benefit from a variety of report options regarding the transaction services.

DETAILED DESCRIPTION OF PREFERRED EMBODIMENTS

The following detailed description refers to the accompanying drawings. The same reference numbers in different drawings may identify the same or similar elements.

Transaction services may be provided to entities that need a network solution for short (e.g., typically 15 seconds or less) connections for their customers (e.g., merchants) to reach their hosts. A majority of traffic in transaction services can arise from credit or debit card transactions; but other types of traffic may also utilize these services, including insurance verification, home health monitoring, processing of fishing and hunting licenses, etc. Transaction services customers are typically referred to as "processors" or "hosts" that act as middle men between, for example, merchants on one end and banks or card marketing organizations (e.g., Visa®, Mastercard®, etc.) on the other end.

Systems and/or methods described herein may include one or more devices within a transaction services hub to provide customers with customized reporting and administration capabilities for a transaction services network. In one implementation, devices within a transaction services hub may collect session data of transaction services for multiple customers and provide a user interface with reporting options for transaction services associated with a particular customer. The user interface may be accessible to a user device via a public network connection (e.g., via a secure login account). The devices may receive a report request from a user account associated with the particular customer and may retrieve, from the collected session data, data responsive to the report request. The one or more devices may generate a report for the particular customer based on the report request and the data responsive to the report request.

Figure 1:
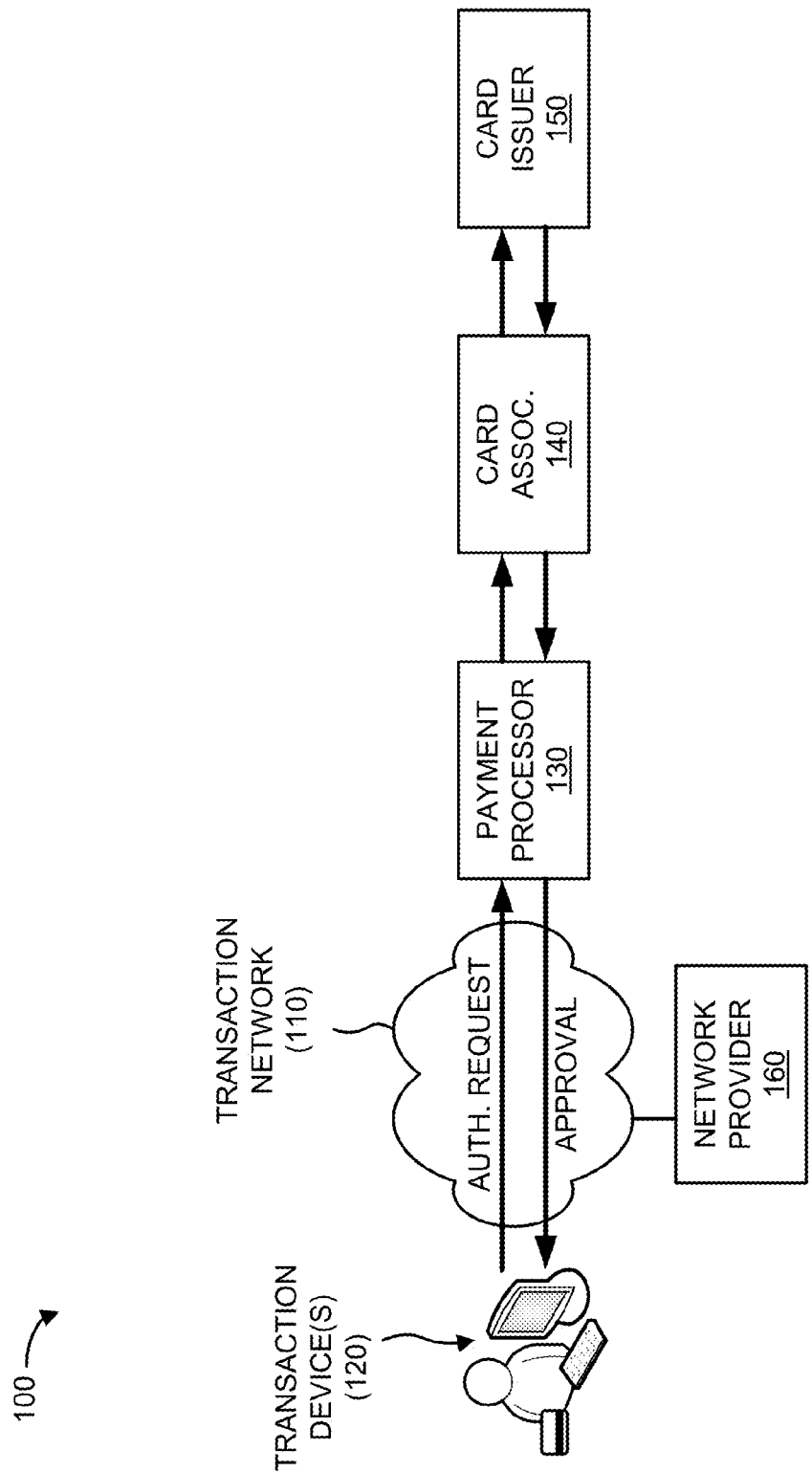
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include a transaction network 110, a transaction device 120, a payment processor 130, a card association 140, a card issuer 150, and a network provider 160. Devices and/or networks of FIG. 1 may be connected via wired and/or wireless connections.

Transaction network 110 may include a network to facilitate data communications, such as credit card authorizations, between transaction device 120 and payment processor 130. Particularly, transaction network 110 may facilitate transactions characterized by short sessions, low bandwidth requirements, and quick call set-ups, for inquiry-response applications. Transaction network 110 may generally include one or more wired, wireless, and/or optical networks that are capable of receiving and transmitting data, voice and/or video signals. For example, transaction network 110 may include one or more public switched telephone networks (PSTNs) or another type of switched network. Transaction network 110 may also include one or more wireless networks and may include a number of transmission towers for receiving wireless signals and forwarding the wireless signals toward the intended destination. Transaction network 110 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. In some implementations, transaction network 110 may include a private network controlled by, for example, a telecommunications company (e.g., network provider 160) that provides telephone and/or data access to transaction device 120. In another implementation, transaction network 110 may include a public network, such as the Internet, or a combination of public and private networks. Transaction network 110 is described further in connection with, for example, FIGS. 2 and 3.

Transaction device(s) 120 may include one or more computing devices and/or servers that participate in a transaction, such as a purchase of goods or services from a merchant or other entity associated with transaction device 120. For example, transaction device 120 may include an electronic cash register or point-of-sale system at a retail location or another device/system that is able to receive payment information and/or other information from a user and/or a payment card (e.g., credit card, identity card, etc.). Additionally, or alternatively, transaction device may include a personal computer, a laptop computer, a tablet or "pad" computer, a personal communications system (PCS) terminal (e.g., that may combine a cellular radiotelephone with data processing and data communications capabilities), a personal digital assistant (PDA, e.g., that can include a radiotelephone, a pager, Internet/intranet access, etc.), a smartphone, or other types of computation and/or communication devices. In one implementation, transaction device 120 may include any device (e.g., an IP-based device) that enables a user to access the Internet and/or communicate with other devices. In one implementation, transaction device 120 may communicate with payment processor 130 via transaction network 110 when a transaction (e.g., a credit card purchase, point-of-sale transaction, etc.) is taking place.

Payment processor 130 may include one or more server devices, or other types of computation or communication devices, that gather, process, search, and/or provide information in a manner described herein. Payment processor 130 (also referred to as a "host") may route an authorization request from transaction device 120 to a particular card association 140. Payment processor 130 may be included, for example, within a customer's private network. In one implementation, payment processor 130 may receive, via transaction network 110, an inquiry (e.g., an authorization request) from transaction device 120 and provide a response (e.g., an approve/decline decision from card issuer 150) to transaction device 120 to facilitate a data transaction.

Card association 140 may include one or more server devices, or other types of computation or communication devices. Card association 140 may include, for example, an entity formed to administer and promote credit cards (e.g., Visa, Master Card, etc.).

Card issuer 150 may include one or more server devices, or other types of computation or communication devices. Card issuer 150 may include, for example, a bank or other institution that authorizes a transaction (e.g., verifies that sufficient funds are associated with a credit card, verifies access rights, etc.). In one implementation, card issuer 150 may receive an authorization request that originates from transaction device 120 and provide a response and/or authorization code to approve a transaction.

Network provider 160 may include an entity that provides and manages all or a portion of transaction network 110. Network provider 160 may receive fees (e.g., a per-transaction fee, flat fee, etc.) for providing transaction services via transaction network 110.

According to an implementation described herein, a merchant may utilize transaction device 120 to initiate transaction services (e.g., a credit card authorization request), via transaction network 110, originating using either a dial (e.g., voice network) or non-dial (e.g., Internet) connection. Regardless of the originating connection from transaction device 120, transaction network 110 may provide a single interface to payment processor 130. As described further herein, transaction network 110 may provide secure connections with management and reporting tools for customers (e.g., payment processor 130) of transaction network 110.

The exemplary configuration illustrated in FIG. 1 is provided for simplicity. It should be understood that a typical network may include more or fewer devices than illustrated in FIG. 1. For example, network 100, may include thousands of transaction devices 120 via which transactions may be made. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
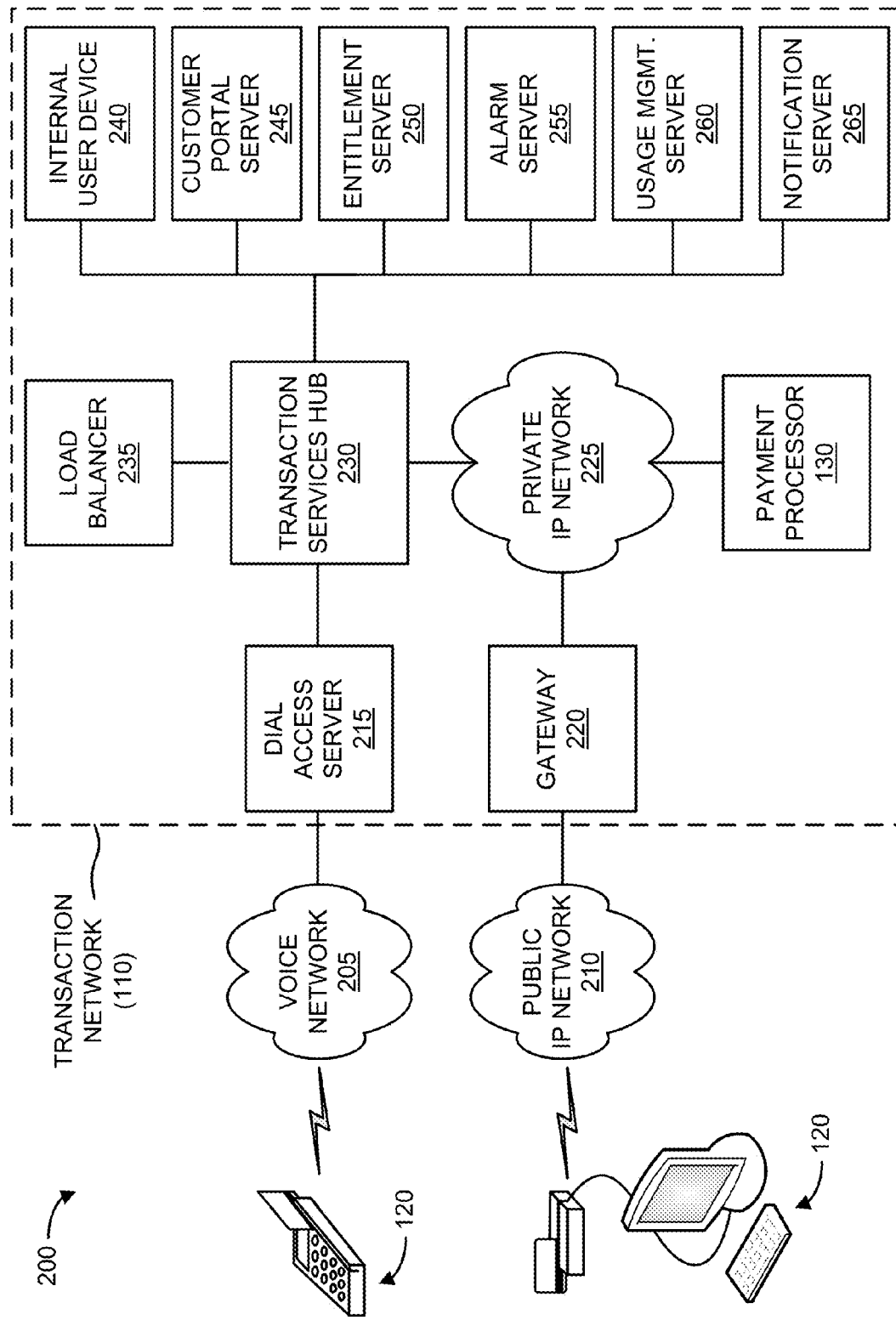
FIG. 2 is a diagram that illustrates additional details of a portion of the network of FIG. 1.

FIG. 2 provides a diagram of a portion 200 of network 100. As shown in FIG. 2, network portion 200 may include transaction devices 120, payment processor 130, a voice network 205, a public IP network 210, a dial access server 215, a gateway 220, a private IP network 225, a transaction services hub 230, a load balancer 235, an internal user device 240, a customer portal server 245, an entitlement server 250, an alarm server 255, a usage management server 260, and a notification server 265. Transaction devices 120 and payment processor 130 may include features described above in connection with FIG. 1.

Voice network 205 may include components that facilitate transfer of voice traffic and/or data traffic. For example, voice network 205 may include a PSTN, a domestic toll-free voice network, and/or an international toll-free voice network.

Public IP network 210 may include a wide area network, an intranet, or a combination of networks that support IP communications. Public IP network 210 may include, for example, an untrusted network, such as the Internet. Public IP network 210 may further include transport and/or network devices such as routers, switches, and/or firewalls.

Dial access server 215 may include one or more server devices, or other types of computation or communication devices. In one implementation, dial access server 215 may receive circuit-based signals and demodulate voice-band data of the circuit-based signals. The dial access server 215 may then extract IP packets for routing (e.g., via a TCP connection) to the appropriate destination, such as transaction services hub 230.

Gateway 220 may include one or more data transfer devices (or network devices), such as a gateway, a router, a switch, a firewall, a network interface card (NIC), a hub, a bridge, a proxy server, an optical add-drop multiplexer (OADM), or some other type of device that provides an interface between different network types. In one implementation, gateway 220 may include a hyper-text transfer protocol (HTTP) gateway or a secure socket layer (SSL) gateway to act as intermediary between public IP network 210 and private IP network 225.

Private IP network 225 may include devices and/or systems for providing services, such as a service for data transfers, voicemail, call blocking, calling card, audio, and/or network conferencing, etc. In some implementations, private IP network 225 may provide redundancy and/or the ability to distribute network loads. For example, private IP network 225 may include an IP network or a multiprotocol label switching (MPLS) network implementing an Interior Gateway Protocol (IGP) or another protocol that implements a minimum cost end-to-end path for routing between nodes. Private IP network 225 may provide one or more interface options to payment processor 130 (e.g., residing on a local customer network).

Transaction services hub 230 may include one or more server devices, or other types of computation or communication devices. Transaction services hub 230 may manage transactions from transaction device 120 via voice network 205 and/or from transaction device 120 via public IP network 210 (via gateway 220 and private IP network 225). Transaction services hub 230 may establish/maintain connectivity (e.g., secure TCP/IP sessions) with multiple payment processors 130, may route particular transaction authorization requests from a transaction device 120 to the appropriate payment processor, and may return responses (e.g., from payment processor 130) to the originating transaction device 120. For example, transaction services hub 230 may maintain a persistent socket connection (e.g., multiplexing user sessions over a single TCP session) to payment processor 130, non-persistent socket connections; multiple interfaces to multiple payment processors (e.g., with load balancing and/or failover services), support proprietary host protocols, TCP/IP interfaces, X.25 interfaces, etc. Transaction services hub 230 may also collect data regarding the transactions and provide an interface to retrieve reports based on the collected data.

Load balancer 235 may include one or more server devices, or other types of computation or communication devices. Load balancer 235 may receive transaction services requests and load balance the requests over devices in transaction services hub. For example, load balancer 235 may forward a received transaction services request to a device within transaction services hub 230 based on available resources (e., processing time), geography, etc. For example, in one implementation, transaction services hub may include multiple redundant components with geographic diversity to enable seamless failover if a particular connection between payment processor 130 and transaction services hub 230 fails.

Generally, internal user device 240, customer portal server 245, entitlement server 250, alarm server 255, usage management server 260, and notification server 265 may provide various interfaces to transaction services hub 230. In one implementation, each of internal user devices 240, customer portal server 245, entitlement server 250, alarm server 255, usage management server 260, and notification server 265 may be integrated with other systems/services provided by network provider 160. For example, one or more of user device 240, customer portal server 245, entitlement server 250, alarm server 255, usage management server 260, and notification server 265 may provide access to information from multiple services (e.g., wireless services, Internet services, telephone services, etc.) besides transaction services.

User device 240 may include one or more computing devices, servers, or other types of computation or communication devices, that provide secure internal access to transaction services hub 230. User device 240 may, for example, allow users (e.g., a network administrator) to communicate with components of transaction services hub 230 via private secure connections. Users may use user device 240 to submit configuration settings, service level agreement (SLA) information, provisioning, etc. related to a particular payment processor 130.

Customer portal server 245 may include one or more network devices, or other types of computation or communication devices, that provide limited external access to transaction services hub 230. For example, customer portal server 245 may enable an authorized customer to access reporting data, residing in transaction services hub 230, that relates to a particular host (e.g., payment processor 130). In one implementation, customer portal server 245 may provide a common web-based interface to access multiple types of services (e.g., transaction services and other services). Access to services via customer portal server 245 may be restricted for example to users with registered accounts and secure passwords.

Entitlement server 250 may include one or more network devices, or other types of computation or communication devices that control what users (or user accounts) are permitted to access particular services. For example, entitlement server 250 may provide to transaction services hub 230 a file or list of user accounts that are authorized to access particular components of transaction services hub 230 (e.g., via internal user device 240 or customer portal server 245). In one implementation, entitlement server 250 may receive lists of authorized internal and/or external users from another device, such as a device associated with a subscription/account system.

Alarm server 255 may include one or more network devices, or other types of computation or communication devices that track and disperse alarm information relating to transaction services hub 230. For example, if transaction services hub 230 identifies a problem (e.g., a failed link with a payment processor 130), transaction services hub 230 may signal alarm server 255 to generate alarms to appropriate monitoring systems and/or ticketing systems. In one implementation, alarm server 255 may also consolidate and/or correlate alarms from multiple services (e.g., wireless services, Internet services, and/or transaction services).

Usage management server 260 may include one or more network devices, or other types of computation or communication devices that track system usage by customers. For example, usage management server 260 may collect transaction statistics from transaction services hub 230 to generate customer invoices.

Notification server 265 may include one or more network devices, or other types of computation or communication devices that generate notifications (e.g., email, text messages, etc.) for customers and/or internal users. For example, notification server 265 may receive indications of service interruptions (e.g., scheduled maintenance, outages, etc.) and automatically send notifications to particular customer accounts.

Although FIG. 2 shows exemplary components of network portion 200, in other implementations, network portion 200 may include fewer, different, differently-arranged, or additional components than those depicted in FIG. 2. Alternatively, or additionally, one or more components of network portion 200 may perform one or more other tasks described as being performed by one or more other components of network portion 200.

Figure 3:
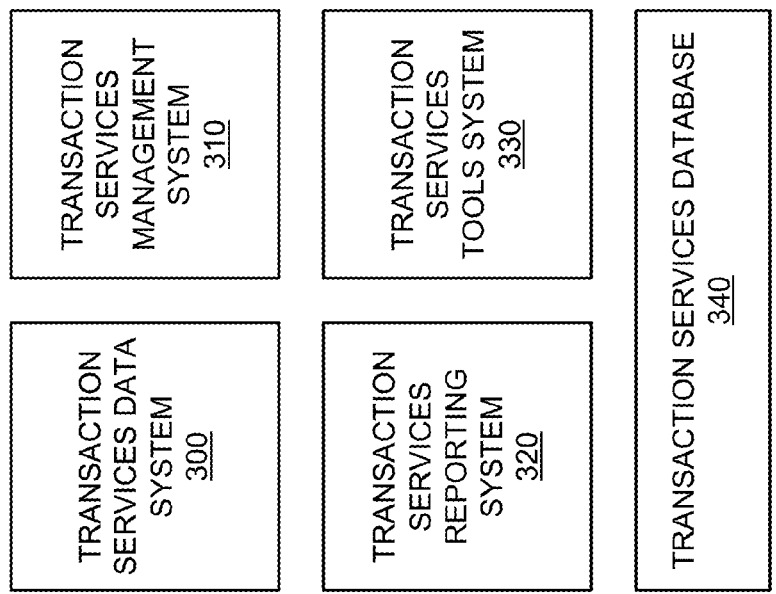
FIG. 3 is a diagram that illustrates components of a transaction services hub of FIG. 2.

FIG. 3 is a diagram that illustrates components of transaction services hub 230. As shown in FIG. 3, transaction services hub 230 may include a transaction services data system 300, a transaction services management system 310, a transaction services reporting system 320, a transaction services tools system 330, and a transaction services database 340.

Transaction services data system 300 may include one or more network devices, or other types of computation or communication devices. Transaction services data system 300 may generally be the primary component of transaction services hub 230 for processing customer transactions. Transaction services data system 300 may manage and/or monitor customer traffic (e.g., traffic relating to transaction services). Transaction services data system 300 may communicate with other components of transaction services hub 230 (e.g., transaction services management system 310, transaction services reporting system 320, etc.) to receive configuration settings and provide transaction statistics. For example, transaction services data system 300 may log information (e.g., origination source, time, etc.) about voice network transaction requests (e.g., via voice network 205) and/or an IP network transaction requests (e.g., via 210) and send the logged information to transaction services tools system 330 and/or transaction services tools database 340. Logged information may include usage detail records; session detail records; application status records; alarm detail files; and/or log files, crash dumps, or core files from transaction services data system 300 applications. Transaction services data system 300 may also monitor the health status of customer hosts (e.g., each payment processor 130) and gather data related to each processed transaction.

In one implementation, transaction services data system 300 may include instances of a transaction gateway application for each customer (e.g., one or more instances for each payment processor 130). The transaction gateway application may be the primary driver for processing customer connections. For example, transaction services data system 300 may receive an authorization request from transaction device 120 to initiate a transaction, may route the authorization request to an appropriate payment processor 130, and may return a response (e.g., approve/reject) from payment processor 130 to transaction device 120. The transaction gateway application may also apply/strip headers for packets, identify frame start/stops, and route communications based on active monitoring/capacities. In one implementation, transaction services data system 300 may be included as a blade system. Transaction services data system 300 may also be configured as a fully redundant system with no single point of failure.

Transaction services management system 310 may include one or more network devices, or other types of computation or communication devices. In one implementation, transaction services management system 310 may provide an internal portal (e.g., a Web-based system for internal users of network provider 160) for service delivery, operations, and marketing related to transaction services provided by transaction services hub 230. For example, transaction services management system 310 may provide for customer provisioning, configuration management, reporting, troubleshooting, and/or SLA management and publishing.

Transaction services reporting system 320 may include one or more network devices, or other types of computation or communication devices. Transaction services reporting system 320 may provide to customers (e.g., users associated with payment processor 130) reporting and/or administrative tools for transaction services provided by transaction network 110. In one implementation, customers may access transaction services reporting system 320 via a customer portal (e.g., a Web-based system for external users of network provider 160). For example, customer portal server 245 may provide a gateway to transaction services reporting system 320. Transaction services reporting system 320 may provide customers with a variety of reporting formats/data and may give customers the ability to manage traffic to particular hosts using, for example, a Web-based interface. Transaction services reporting system 320 is described further in connection with, for example, FIGS. 5-14.

Transaction services tools system 330 may include one or more network devices, or other types of computation or communication devices. Transaction services tools system 330 may include collector applications and tools applications. The collector applications generally may receive and format data for storage. The tool applications generally may provide a variety of applications to manipulate, process, and/or control reporting of stored data. In one implementation, transaction services tools system 330 may provide interfaces to billing, provisioning, monitoring, customer notification, and enterprise support systems. Transaction services tools system 330 may also include various tools to manage and maintain the other components. In one implementation, transaction services tools system 330 may also communicate with a back-end database (e.g., transaction services database 340) to format and store statistics of processed transactions.

Transaction services database 340 may store transaction information collected and/or generated by one or more of transaction services data system 300, transaction services management system 310, transaction services reporting system 320, and transaction services tools system 330. In one implementation, stored information in transaction services database 340 may be retrieved directly by one of transaction services data system 300, transaction services management system 310, transaction services reporting system 320, or transaction services tools system 330. In another implementation, transaction services tools system 330 may process data retrieval requests from the other transaction services hub 230 components. In one implementation, transaction services database 340 may include stored procedures (e.g., subprograms, such as Oracle® Stored Procedures, etc.) to manipulate data. For example, access to transaction services database 340 from a website (e.g., from transaction services reporting system 320 via customer portal server 245) may be completed using calls to stored procedures to prevent common security breaches, such as SQL injection, etc. Thus, components of transaction services hub 230 may access transaction services database 340 using calls to stored procedures.

Although FIG. 3 shows exemplary components of transaction services hub 230, in other implementations, transaction services hub 230 may include fewer, different, differently-arranged, or additional components than depicted in FIG. 3. Alternatively, or additionally, one or more components of transaction services hub 230 may perform one or more other tasks described as being performed by one or more other components of transaction services hub 230.

Figure 4:
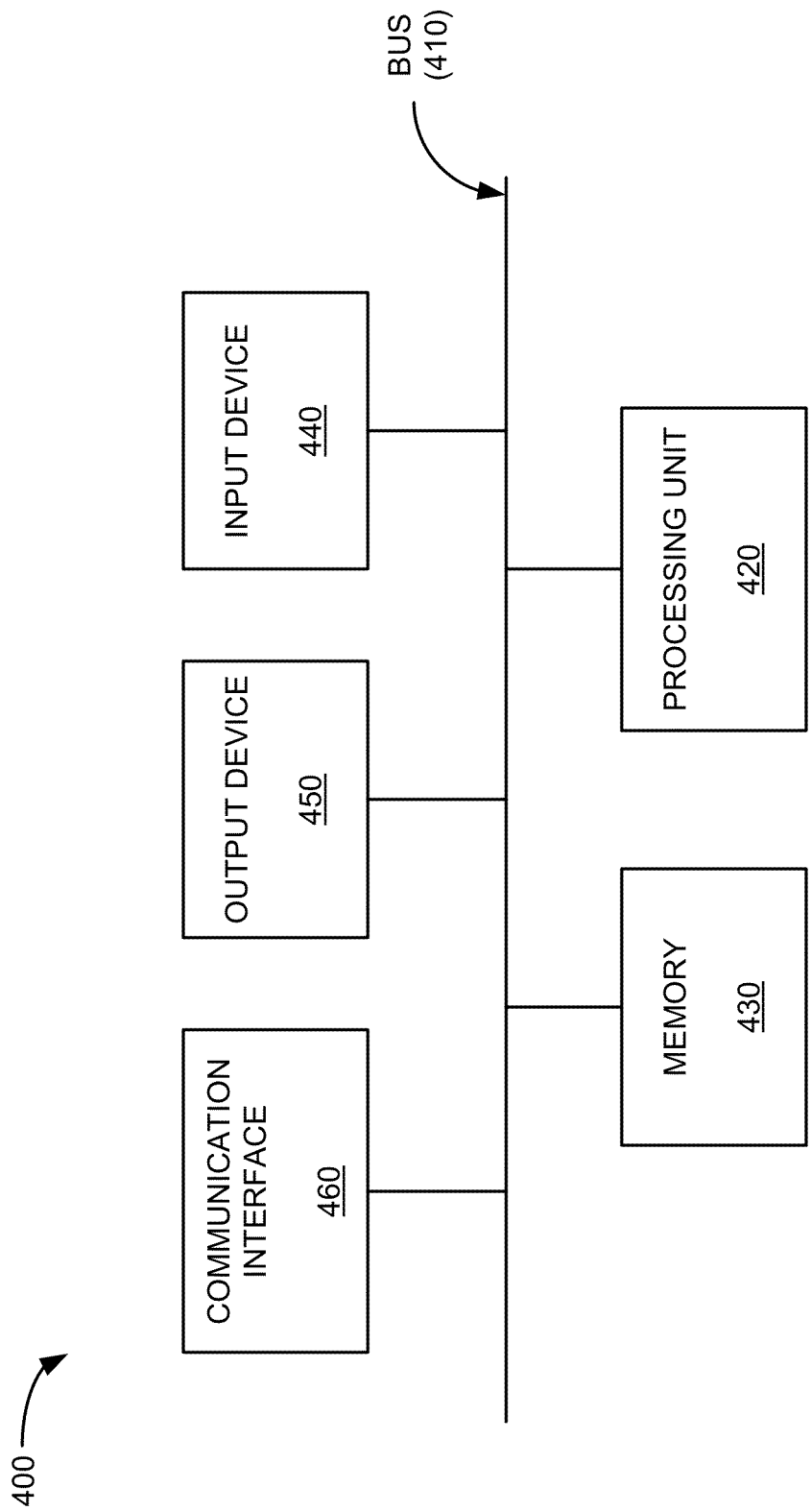
FIG. 4 is a diagram of exemplary components of a device that may be used within the network of FIGS. 1-3.

FIG. 4 is a diagram of exemplary components of a device 400. Device 400 may correspond to transaction device 120, payment processor 130, dial access server 215, gateway 220, load balancer 235, user device 240, customer portal server 245, entitlement server 250, alarm server 255, usage management server 260, notification server 265, transaction services data system 300, transaction services management system 310, transaction services reporting system 320, transaction services tools system 330, or transaction services database 340. Each of transaction device 120, payment processor 130, dial access server 215, gateway 220, load balancer 235, user device 240, customer portal server 245, entitlement server 250, alarm server 255, usage management server 260, notification server 265, transaction services data system 300, transaction services management system 310, transaction services reporting system 320, transaction services tools system 330, and transaction services database 340 may include one or more devices 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for execution by processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, or the like. Output device 450 may include a device that outputs information to the operator, such as a display, a speaker, etc.

Communication interface 460 may include a transceiver (e.g., a transmitter and/or receiver) that enables device 400 to communicate with other devices and/or systems. For example, communication interface 460 may include mechanisms for communicating with other devices, such as other devices of network 100 or another device 400.

As described herein, device 400 may perform certain operations in response to processing unit 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
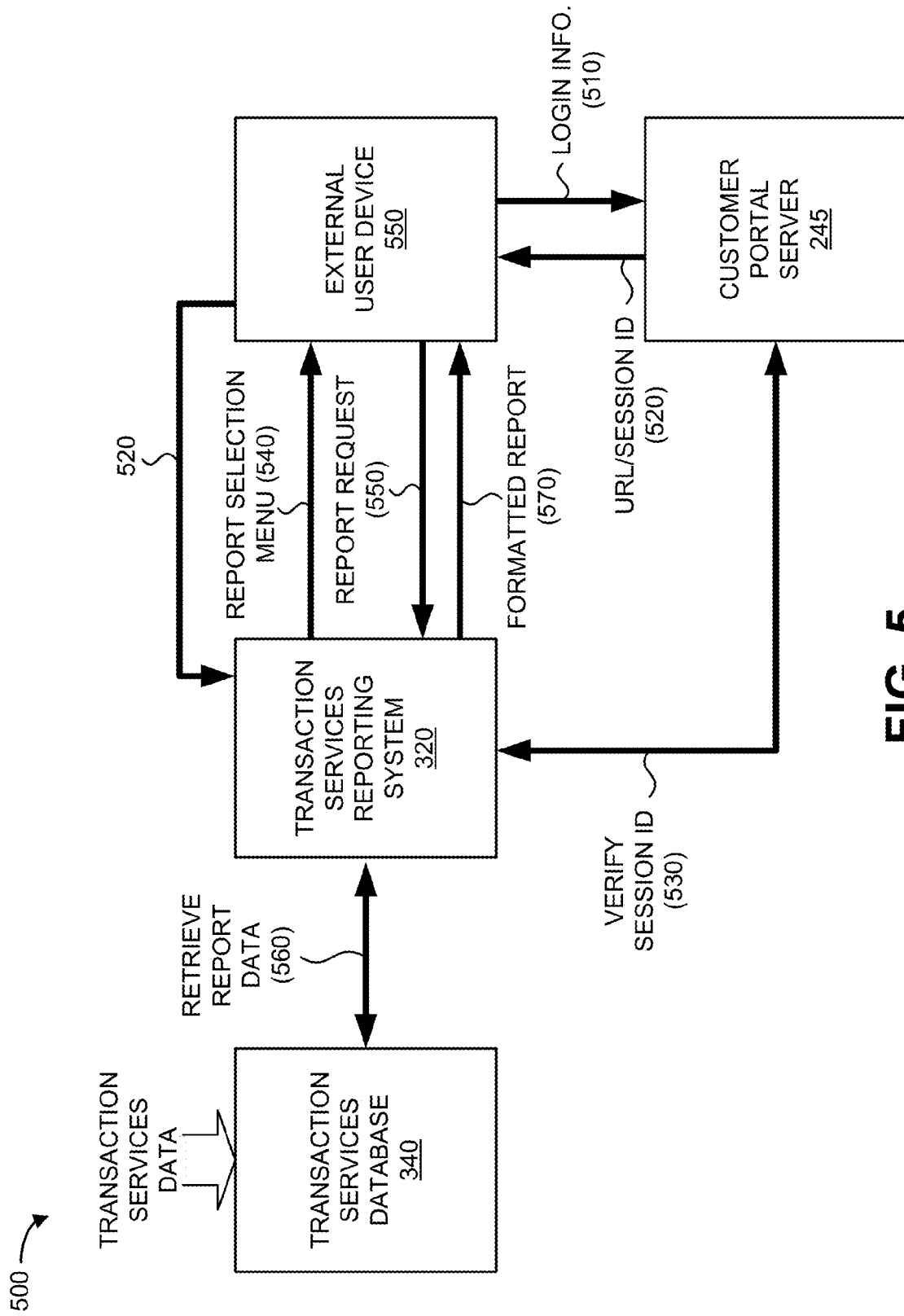
FIG. 5 is a diagram of exemplary communications for a portion of the network of FIG. 2.

FIG. 5 is a diagram of exemplary communications for a portion 500 of network portion 200. As shown in FIG. 5, network portion 500 may include customer portal server 245, transaction service reporting system 320, transaction services database 340, and an external user device 550. External user device 550 may include, for example, a computing or communication device, such as a personal computer, a personal digital assistant, or a smart phone.

External user device 550 and customer portal 245 may initially exchange information to authenticate a user. For example, external user device 550 may send login information 510 to customer portal 245 to access a secure customer account and/or select an available transaction services menu option. Assuming login information 510 is correct, customer portal server 245 may provide a URL and session ID 520 for transaction service reporting system 320. External user device 550 may provide use URL and session ID 520 to initiate communications with transaction service reporting system 320. As indicated by reference number 530, transaction service reporting system 320 may communicate with customer portal server 245 to verify the session ID provided by external user device 550 is valid.

If transaction service reporting system 320 and customer portal server 245 successfully verify the session ID, transaction service reporting system 320 may provide a report selection menu 540 to external user device 550. Report selection menu 540 may provide an option to select and/or run standard reports. Reports selection menu 540 may include, for example, a list of menu items, a tiered listing, or another arrangement of report selections. External user device 550 may receive report selection menu 540 and present report selection menu 540 to a user (e.g., via a browser interface). A user may select (e.g., via the browser interface) a particular report from report selection menu 540.

Based on the user's selection from report selection menu 540, external user device 550 may submit a report request 550 to transaction service reporting system 320. Transaction service reporting system 320 may receive report request 550 and may retrieve data from transaction services database 340 for the requested report, as indicated by reference number 560. Transaction service reporting system 320 may receive data 560 from transaction services database 340 and may format the data into a formatted report, chart, etc. Transaction service reporting system 320 may forward the formatted data to external user device 550 as a formatted report 570. External user device 550 may receive formatted report 570 and may present formatted report 570 to a user (e.g., via a browser interface).

Figure 6:
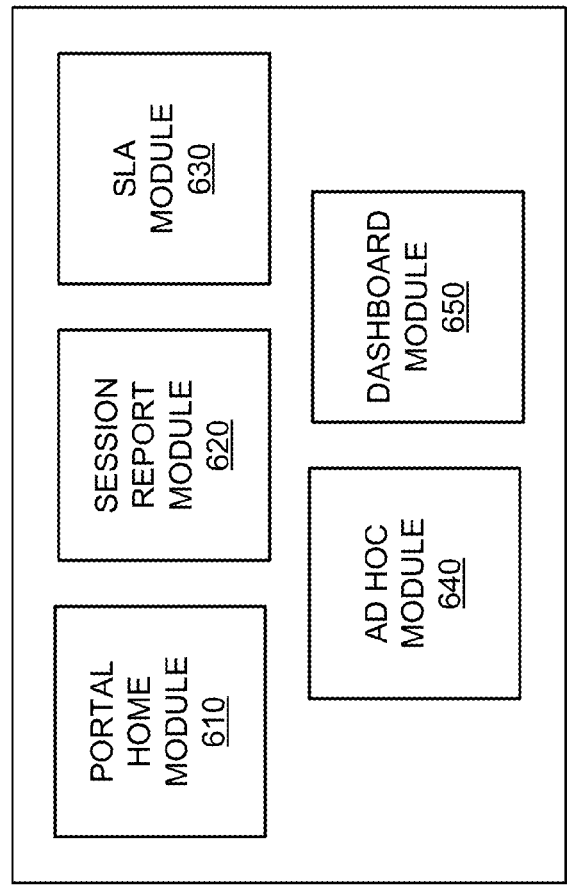
FIG. 6 is a block diagram of exemplary functional components of the transaction services reporting system of FIG. 3.

FIG. 6 is a block diagram of exemplary functional components of transaction services reporting system 320. As shown, transaction services reporting system 320 may include a portal home module 610, a session report module 620, a SLA module 630, an ad hoc module 640, and a dashboard module 650. Depending on the implementation, transaction services reporting system 320 may include additional, fewer, or different functional components than those illustrated in FIG. 6.

Generally, the functional components of FIG. 6 may generate and perform communications for report selection menus 540 and formatted reports 570 that may be viewed by a user of user device 550.

Figure 7:
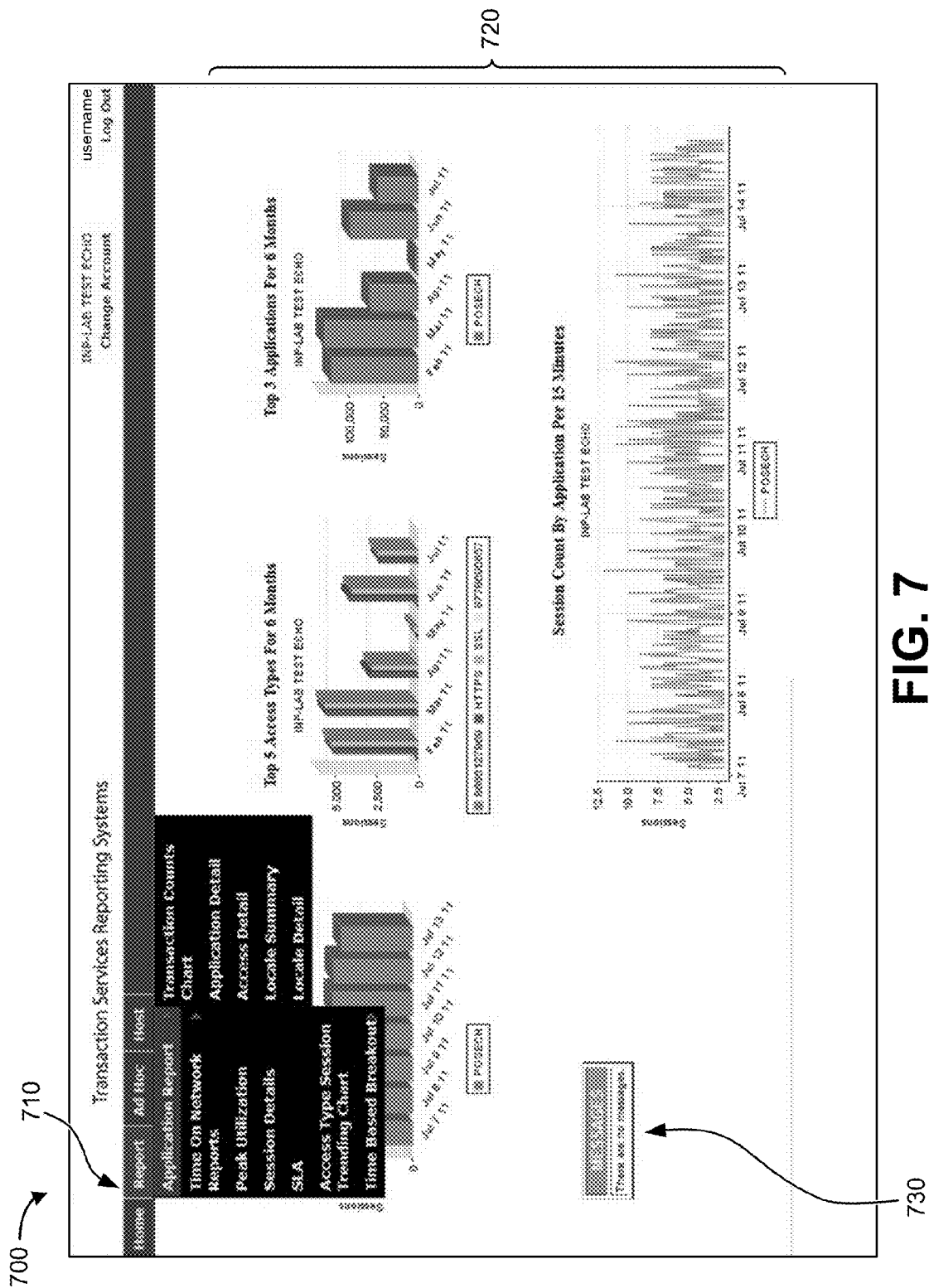
FIG. 7 is a diagram of a portal home user interface for the transaction services reporting system of FIG. 3.

Portal home module 610 may generate and provide a portal home page associated with a user account. For example, portal home module 610 may provide the portal home page in response to a successful login for a particular host account or in response to selection of a transaction services option from a menu of possible services available to logged-in users. The portal home page may include a navigation menu and a variety of tables and/or charts that provide information relating to transactions for a particular host (e.g., payment processor 130). FIG. 7 provides a sample user interface 700 that may correspond to a portal home page generated by portal home module 610. User interface 700 may include a navigation menu 710, one or more default charts 720, and a message section 730.

Navigation menu 710 may include menu options to select, for example, among a home page, pre-formatted reports, ad hoc reports, and host functions. As shown in FIG. 7, menu items for navigation menu 710 may be grouped by categories and sub-categories. In one implementation, navigation menu 710 may include options for available pre-formatted reports for a particular host (e.g., based on an account associated with a user's login information). Report options in navigation menu 710 may include, for example, a transaction counts report, application detail reports, access detail reports, locale summary reports, locale detail reports, average time on the network (e.g., transaction network 110) reports, counts of time on the network summary reports, counts of time on the network detail reports, peak utilization reports, session details, SLA reports, and/or access type reports. As described further herein, other menu options in navigation menu 710 may include setup and display options for ad hoc reports and/or setup and display options for host dashboard functions.

User interface 700 may also include default charts 720. Default charts 720 may provide a high-level view of a host's traffic (e.g., associated with a particular user account). Default charts 720 may include, for example, charts for a particular host that show the number of sessions used each day, the top five access types for the last six months, the top three applications for the last six months, and the number of sessions by application for each fifteen minute interval over the last seven days. The number of charts, type of charts, and particular arrangement of charts in default charts 720 may be user-configurable. User interface 700 may also include message section 730 with general notices or customer-specific notices that may relate to a particular login account. For example, portal home module 610 may provide notifications for scheduled maintenance, account changes, and/or other information within message section 730.

Referring again to FIG. 6, session report module 620 may generate request forms and pre-formatted reports. In one implementation, session report module 620 may generate a session details selection form to configure a session details report. The session details report may allow a user to view reports on different aspects (or combinations of aspects) of sessions (e.g., transaction services sessions for a particular host). For example, session report module 620 may provide a list of available fields (e.g., from records in database 340) and criteria that may be included in a customized report. A user of user device 550 may select desired options from the session details selection form and may submit the completed form (e.g., via customer portal server 245) to transaction service reporting system 320.

Figure 8:
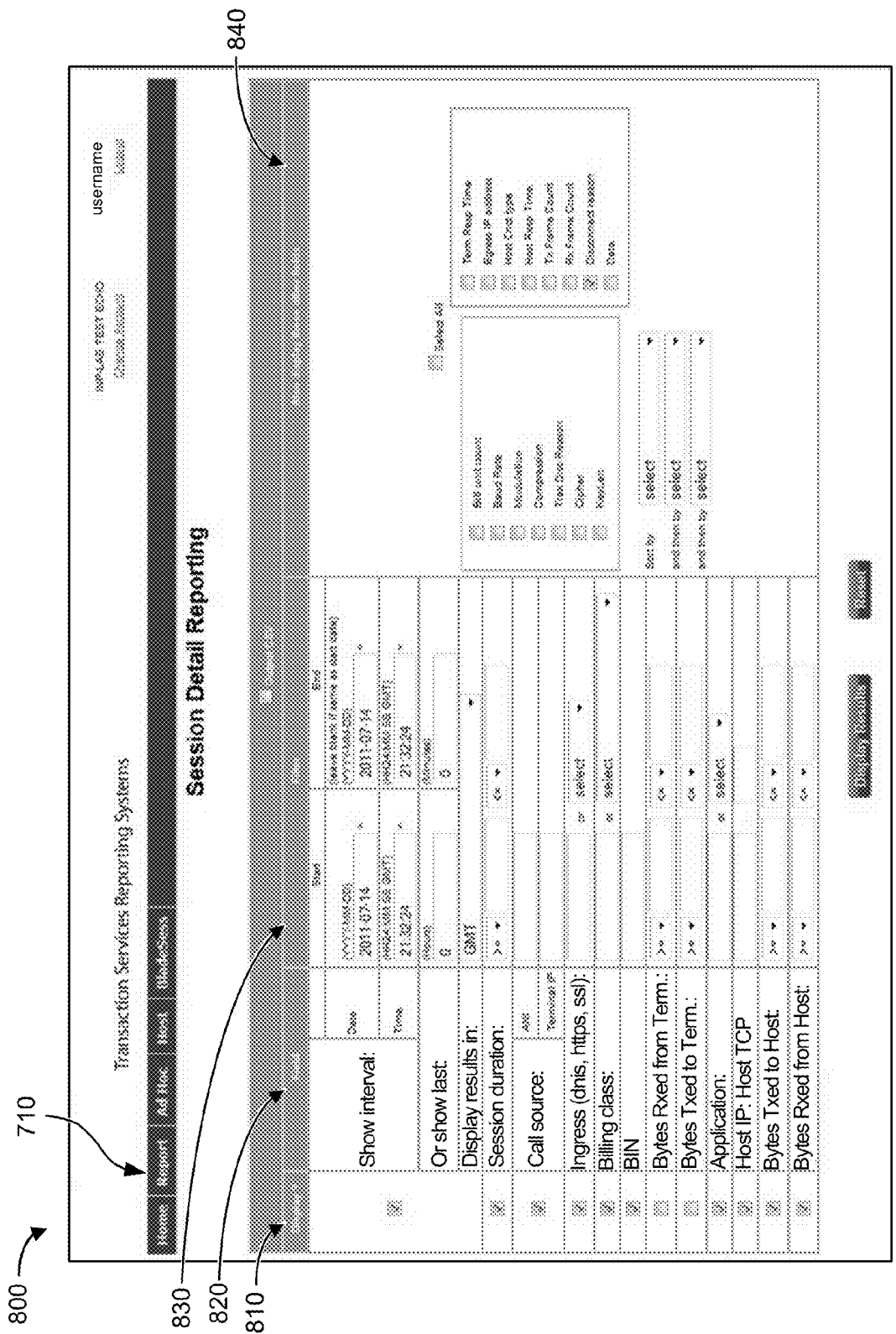
FIG. 8 is a diagram of a session details user interface for the transaction services reporting system of FIG. 3.

FIG. 8 provides a sample user interface 800 that may correspond to a session details selection form provided by session report module 620. User interface 800 may include navigation menu 710, a primary selection section 810, a field description section 820, a primary filter section 830, a secondary selection section 840, and a variety of entries associated with fields 810-840. Primary selection section 810 may include selection options for including particular fields (e.g., associated with field description section 820) in a customized session report. Each item in primary selection section 810 may include a selection mechanism, such as a radio button, checkbox, dropdown menu, etc. to allow a user of user interface 800 to select whether to include, in a session details report, information associated with a particular field.

Field description section 820 may include a field name and/or other information associated with available fields that may be included in a customized session report. Items in field description section 820 may include, for example, a show interval field, a session duration field, a call source field, an ingress field, a billing class field, a bank identification number (BIN) field, a bytes received (Rx) from terminal field, a bytes transmitted (Tx) to terminal field, an application field, a host IP/host TCP field, a bytes transmitted to host field, and a bytes received from host field.

The show interval field may include time period for a request session report. The show interval field may include, for example, a selection mechanism for a particular time interval (e.g., "show interval") or a most recent duration (e.g., "or show last"). In one implementation, a base time for the show interval may also be selected (e.g., to normalize information across multiple time zones so that all dates/times correspond to the same time zone). The session duration field may include a length of a call (e.g., not including modem training). The call source field may include a phone number used to generate a transaction and/or an IP address (e.g., for transaction device 120). The ingress field may include a particular ingress method (e.g., from transaction device 120), such as Dialed Number Identification Service (DNIS), Hypertext Transfer Protocol Secure (HTTPS), or Secure Sockets Layer (SSL) protocol.

The billing class field may include a billing class, which is used to identify how a transaction will be billed. The bank identification number (BIN) field may include a bank identification number or issuer identification number, which identifies an institution that issued a credit/debit card used in a transaction. The bytes received (Rx) from terminal field may include the number of bytes received by a transaction source terminal. The bytes transmitted (Tx) to terminal field may include the number of bytes transmitted by a transaction source terminal. The application field may include the application (hostname) that generated the transaction. The host IP/host TCP field may include a host IP address and port number (e.g., for payment processor 130). The bytes transmitted to host field may include the number of bytes transmitted to the host. The bytes received from host field may include a number of bytes transmitted from the host.

Primary filter section 830 may include options for filtering particular fields (e.g., associated with selections in primary selection section 810) in a customized session report. Each item in primary filter section 830 may include a selection mechanism, such as a checkbox, dropdown menu, free text, etc. to allow a user of user interface 800 to enter a range of information associated with a particular field for a session details report.

Secondary selection section 840 may include a selection mechanism and field name associated with additional fields that may be included in a customized session report. Each item in secondary selection section 840 may include a selection mechanism, such as a radio button, to allow a user of user interface 800 to select whether to include, in a session details report, information associated with a particular field. Items in secondary selection section 840 may or may not be associated with particular ranges or other filters. Items in secondary selection section 840 may include, for example, a bill unit count (e.g., the number of billable units that a transaction incurred), a baud rate (e.g., the baud rate used by a dial-in transaction), a modulation (e.g., the modulation used by the transaction on a dial-in transaction, such as V22BIS or BELL212), a compression (e.g., the compression scheme used by the session), a disconnection code (e.g., for a disconnect from dial access server 215), a cipher (e.g., the cipher that is used by the transaction), a cipher key length, a terminal response time (e.g., in milliseconds), an egress IP address (e.g., the IP address used to egress to the customer host), a host connection type, a host response time (e.g., in milliseconds), a number of transmitted frames in a session, a number of received frames in a session, additional disconnect reasons (e.g., for information other than a disconnect from dial access server 215), or transaction data (e.g., the byte stream making up the transaction).

Figure 9:
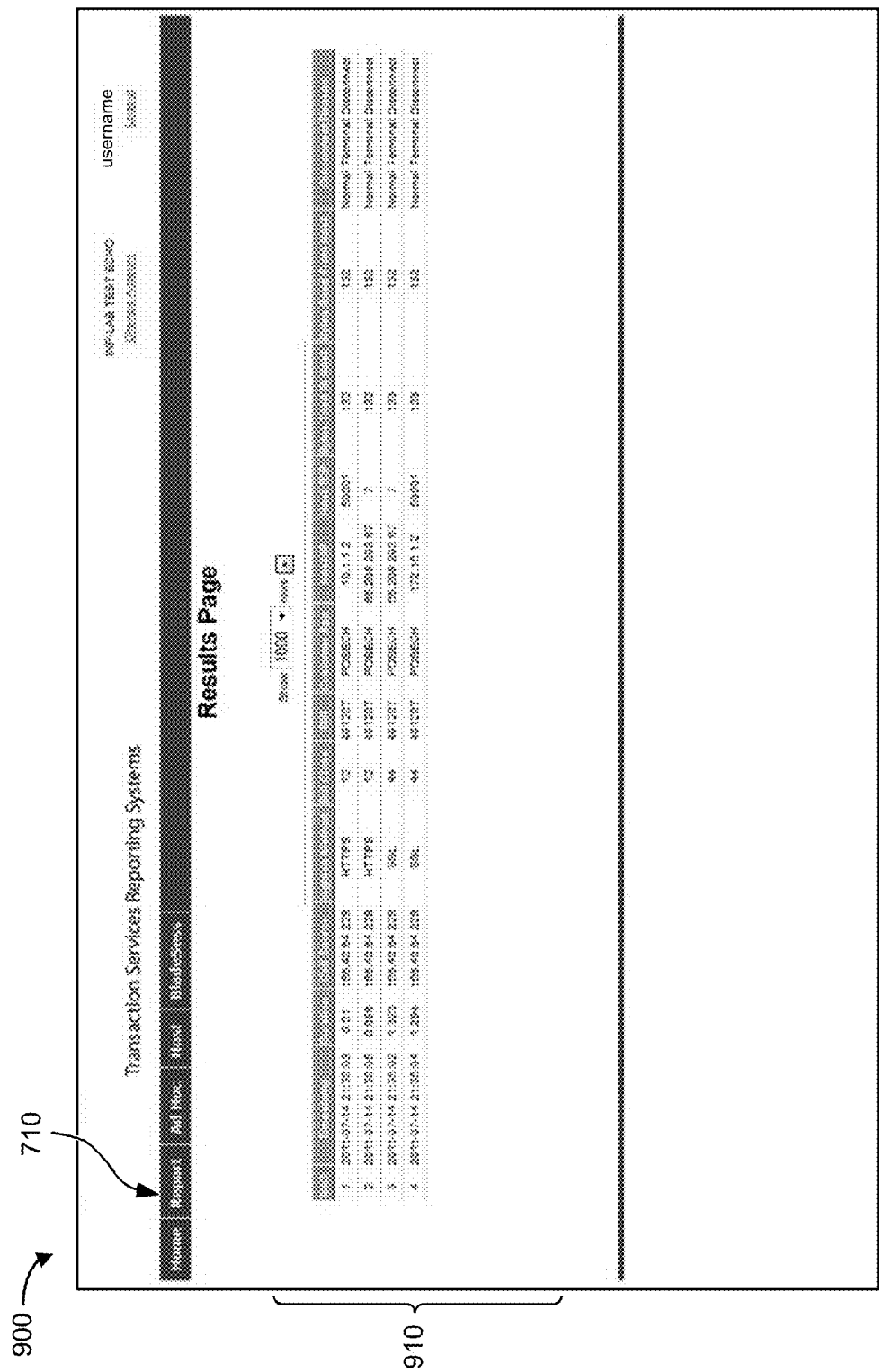
FIG. 9 is a diagram of a results details user interface for the transaction services reporting system of FIG. 3.

Returning to FIG. 6, session report module 620 may generate a report based on the completed form (e.g., based on selected options from user interface 800 and submitted to transaction services reporting system 320) and may provide the report to customer portal server 245. FIG. 9 provides a sample user interface 900 that may correspond to a results details page provided by session report module 620. User interface 900 may include a data table 910, associated with a particular host account, corresponding to the selected fields and filters in user interface 800.

Figure 10:
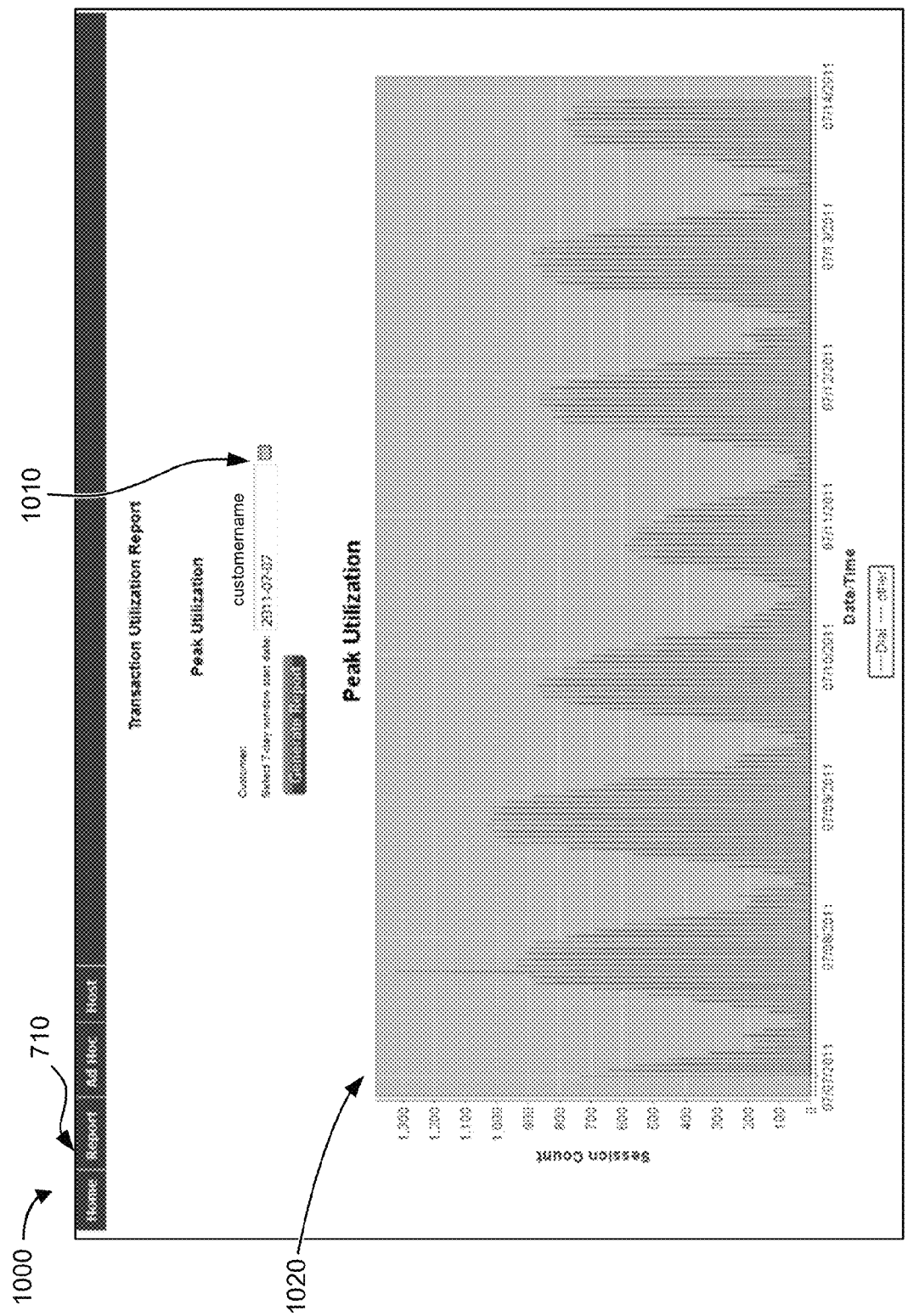
FIG. 10 is a diagram of a transaction utilization user interface for the transaction services reporting system of FIG. 3.

In one implementation, based on selection of a menu item from the reports section of navigation menu 710, session report module 620 may generate a transaction utilization report to provide different views into a customer traffic patterns. For example, the transaction utilization report may show peak number of sessions over time for the various access types that a host may receive. FIG. 10 provides a sample user interface 1000 that may correspond to a transaction utilization report. As shown in FIG. 10, user interface 1000 may include navigation menu 710, a window selection section 1010, and a utilization graph 1020. Window selection section 1010 may include a selection mechanism, such as a dropdown menu, calendar, etc. to allow a user of user interface 1000 to select a date range for utilization graph 1020. Utilization graph 1020 may include a session count over time (e.g., in one-hour intervals or other intervals) for a particular host. In one implementation, utilization chart 1020 may also distinguish between session types (e.g., dial, HTTPS, SSL, etc.).

Returning to FIG. 6, session report module 620 may generate other standardized reports (not shown) based on selection of other menu items from the reports section of navigation menu 710. For example, session report module 620 may generate a transaction counts report (e.g., the number of transactions over particular intervals), an application detail report (e.g., providing a monthly summary for the application and month/year), an access detail report (e.g., showing the total number of sessions by month and ingress method), a locale summary report (e.g., providing a summarization of session counts, ingress characters, reply characters and duration of the session), a locale detail report (e.g., showing the total number of sessions by month and access method), an average time on the network (e.g., transaction network 110) reports (e.g., graph plotting the average time on the network for the sessions, as well as a plot for the session taking the longest time on the network), and/or a counts of time on the network report (e.g., showing the count of occurrences against the amount of time for a single application). Each report generated by session report module 620 may be responsive to a particular filtering criteria defined by the user. In other implementations, a default filtering criteria (e.g., default time period or another range) may be implemented.

Figure 11:
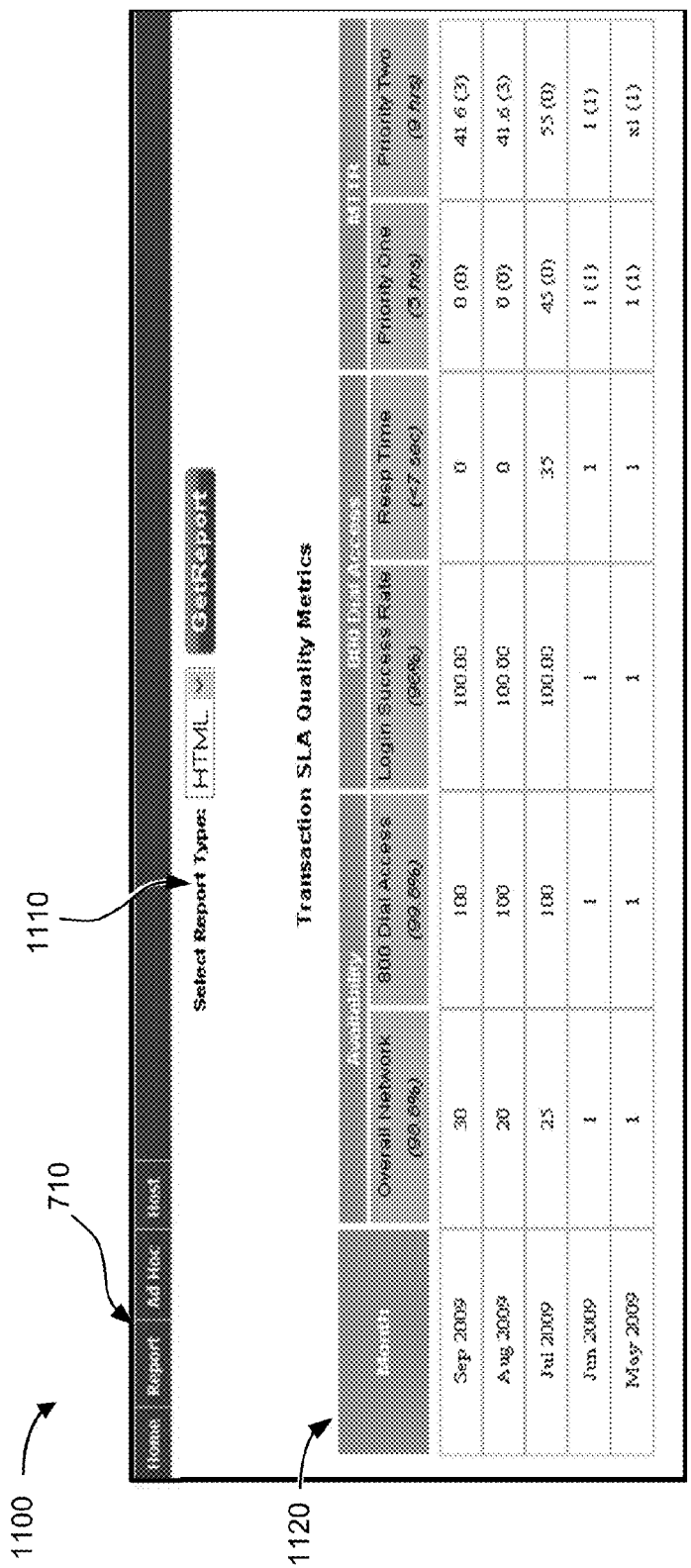
FIG. 11 is a diagram of a service level agreement (SLA) user interface for the transaction services reporting system of FIG. 3.

Based on selection of another menu item from the reports section of navigation menu 710, SLA module 630 may generate a SLA report to provide statistics that are used in measuring service levels. For example, the SLA report may include metrics such as network availability, 800 (e.g., toll-free) dial service levels, and mean time to repair (MTTR). The SLA report may include, for example, a contracted SLA value for each metric and measures performance values for each metric. In one implementation, the SLA report may include an associated query tool to enable a user to select a particular reporting period. FIG. 11 provides a sample user interface 1100 that may correspond to an SLA report generated by SLA module 630. As shown in FIG. 11, user interface 1100 may include navigation menu 710, a select report type section 1110, and a SLA metrics table 1120.

Select report type section 1110 may include selectable options for formatting a report. For example, the report formats may include hyper-text markup language (HTML), which shows the report on the web page, and comma-separated values (CSV), which is a popular format for importing the report into a spreadsheet application. Based on a user's selection, SLA module 630 may generate an SLA report in one of the selected formats. SLA metrics table 1120 may include a month field, an overall network availability field (e.g., the percentage of network availability for the month), an overall 800 dial access availability field (e.g., the percentage of successful dial-up transaction connections for the month), a login success rate for 800 dial access field (e.g., the percentage of successful test transaction sessions for 800 dial access), a response time for 800 dial access field (e.g., the average response time for 800 dial access), a priority one MTTR field (e.g., the actual number of high priority tickets and the mean time to repair expressed in minutes), and a priority two MTTR field (e.g., the actual number of low priority tickets and the mean time to repair expressed in minutes). A heading for each field in SLA metrics table may include, for example, a field title (e.g., "Availability—Overall Network") and a contracted value (e.g., "98.8%" or another value as defined in the customer's SLA) for each field. Values included under each field heading may include measured performance values for that field (e.g., for a corresponding month).

Figure 12:
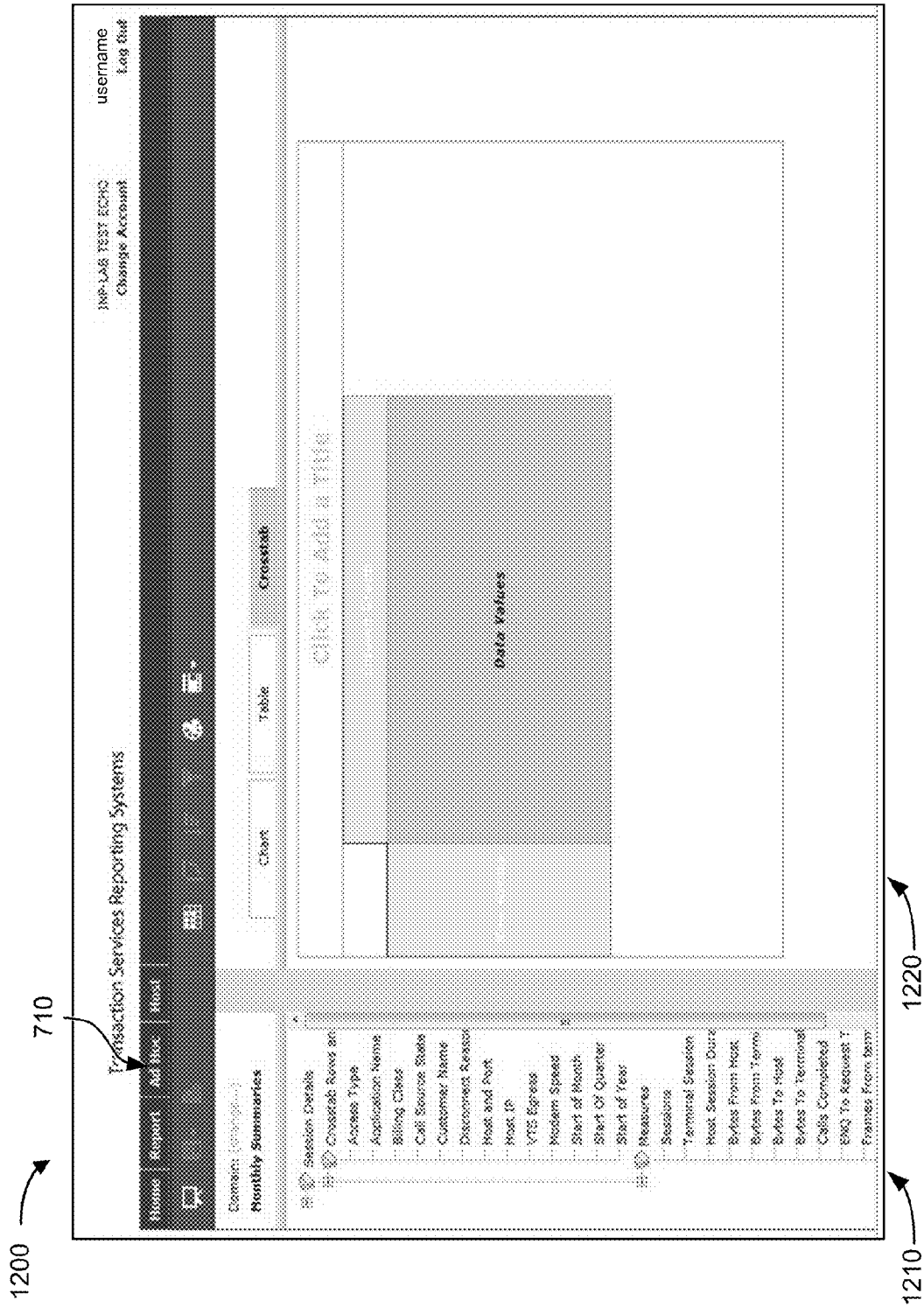
FIG. 12 is a diagram of an ad hoc user interface for the transaction services reporting system of FIG. 3.

Returning to FIG. 6, ad hoc module 640 may solicit configuration settings and generate customized reports of transaction services data for a particular host. For example, ad hoc module 640 may provide a format selection menu and a variety of templates that provide information relating to transactions for a particular host (e.g., payment processor 130). Ad hoc module 640 may provide the ability for the customer to create and save their own reports, and schedule such reports to be periodically generated. FIG. 12 provides a sample user interface 1200 that may correspond to an ad hoc formatting form generated by ad hoc module 640. User interface 1200 may include navigation menu 710, a domain/topic selection section 1210, and a report configuration section 1220.

Navigation menu 710 may include an ad hoc selection section with choices to view specifics about an ad hoc repository, to view specific reports, to create ad hoc reports, and/or to create dashboards. The repository is a container for holding ad hoc reports and report outputs. The repository may include, for example, a data file structure including folders and subfolders of previously-configured ad hoc components.

Domain/topic selection section 1210 may include a list of domains or topics that may be used to generate a report. A topic may answer a specific question against a domain, such as how many failed transactions are there per day. Conversely, a domain may provide a particular view of transaction attributes. In one implementation, ad hoc module 640 may include an interactive set of menus to design a domain for an ad hoc report. For example, ad hoc module 640 may guide a user through the general steps of selecting data, defining filters, formatting a display, and creating a topic for an ad hoc report. Regardless of whether an ad hoc report is created using topics or domains, a report style can be selected from report configuration section 1220.

Report configuration section 1220 may include multiple report styles that may be selected, such as a table, a chart, and a crosstab. In one implementation, each report style may be presented with a separate tab for designing a customized report using the selected style. Templates and/or menu options for the selected styles may differ depending on whether a domain or a topic is selected. Generally, for a domain, report configuration section 1220 may provide interactive menus to select data, define filters, format the display, and create a topic for an ad hoc report. For a topic, report configuration section 1220 may provide an interactive interface to define how a report will be laid out and formatted. A user may start with a blank report and can drag fields and place the columns where desired for the ad hoc report.

Figure 13:
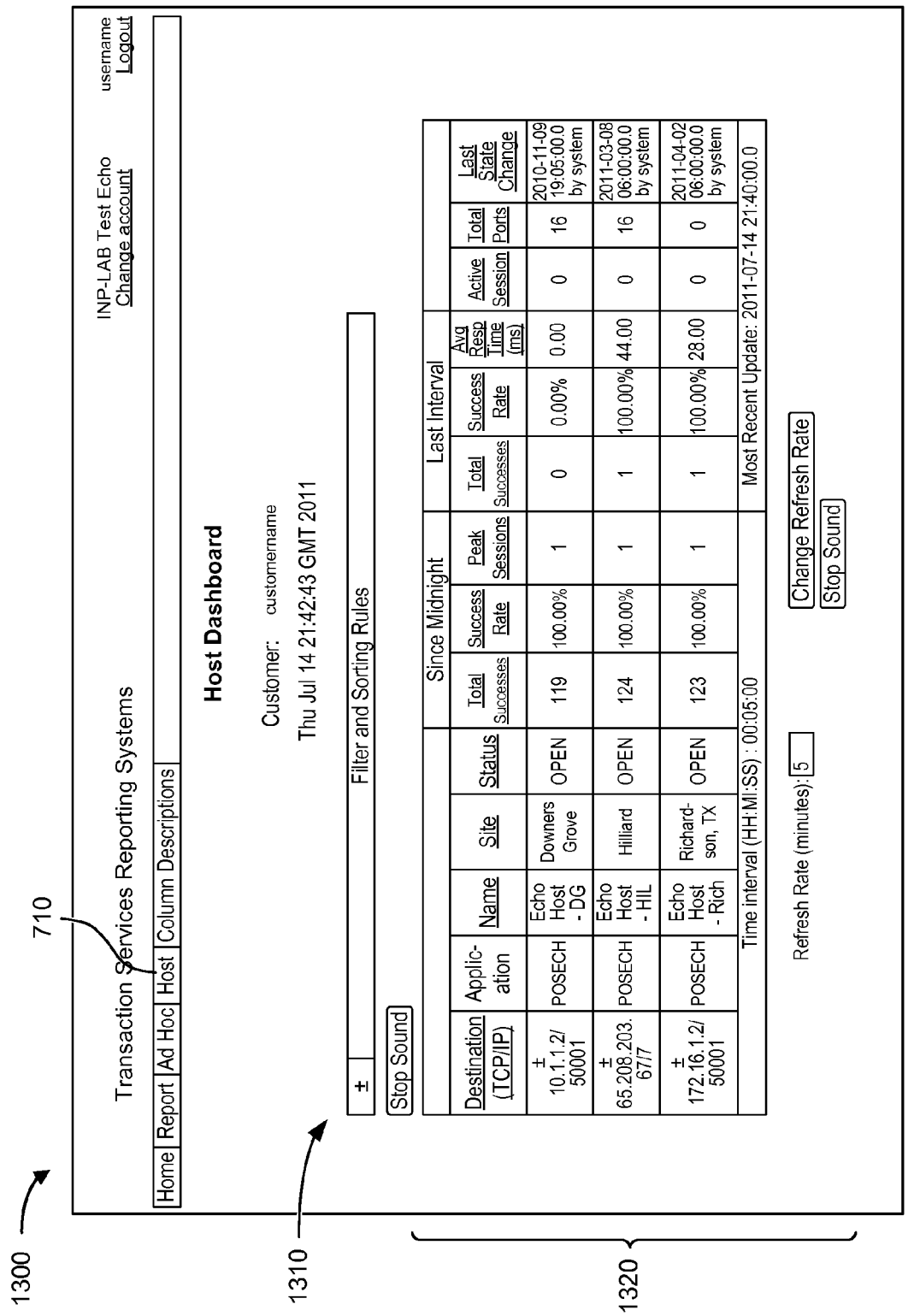
FIG. 13 is a diagram of a host dashboard user interface for the transaction services reporting system of FIG. 3.

Referring back to FIG. 6, dashboard module 650 may solicit configuration settings and generate dashboards for a particular host (e.g., based on a particular user account). A host dashboard may provide a view of the status of customer transaction destinations. For example, a host dashboard may be used to review the status of transactions by destination and the network provider equipment that the transactions terminate on. FIG. 13 provides a sample user interface 1300 for a dashboard that may be generated by dashboard module 650. User interface 1300 may include navigation menu 710, a filter and sorting rules section 1310, and a dashboard section 1320.

Navigation menu 710 may include a host selection section with options for selecting a host dashboard or a host dashboard administration page.

Filter and sorting rules section 1310 may be an expandable/collapsible section of rules that may be selected by the user to control the presentation of dashboard section 1320. Rules available in filter and sorting rules section 1310 may include, for example, site selection (e.g., to include/exclude destinations from the host dashboard), status selection (e.g., to include/exclude destinations that have a particular status, such as "open," "shut," or "down"), and alarm sorting (e.g., to display destinations with alarm conditions at the top of the host dashboard).

Dashboard section 1320 a may include a dashboard for monitoring display of destinations selected in filter and sorting rules section 1310. In one implementation, the dashboard may include a destination field (e.g., showing the IP address and port number of where the TCP connections from transaction services hub 230 terminates), an application field (e.g., the application that the transaction is destined for at the host), a name field (e.g., the name of the destination), a site field (e.g., the geographic location of the destination), a status field (described further below), a total successes field (e.g., the number of transactions that have been successfully completed during a time period), a success rate field (e.g., the percentage of successful transaction during a time period), an average response time field (e.g., how long on average between the time the transaction request is forwarded to the destination and the response is received), an active session field (e.g., a snapshot of the number of active sessions at the time that the last interval ended), a total ports field (e.g., the maximum number of active sessions allowed to the destination), and a last state change field (e.g., the last time when the status column was changed for the destination and who made the change).

The status field of the dashboard may show the status of the connectivity between transaction services hub 230 and the destination. The status field may indicate, for example, "open" (e.g., indicating connectivity appears normal), "down" (e.g., indicating connectivity appears unhealthy), or "shut" (e.g., indicating connectivity has been administratively shut). If the status in the status field is not OPEN, then an alarm condition for the destination may occur (e.g., the corresponding row on the dashboard will flash red and/or an alarm sound may play).

Dashboard section 1320 may also include a refresh rate option and a sound control option. The refresh rate option may control the amount of time (e.g., in minutes) used to refresh the display. The sound control option may toggle on/off sounds that play when there is a destination with an alarm condition.

Figure 14:
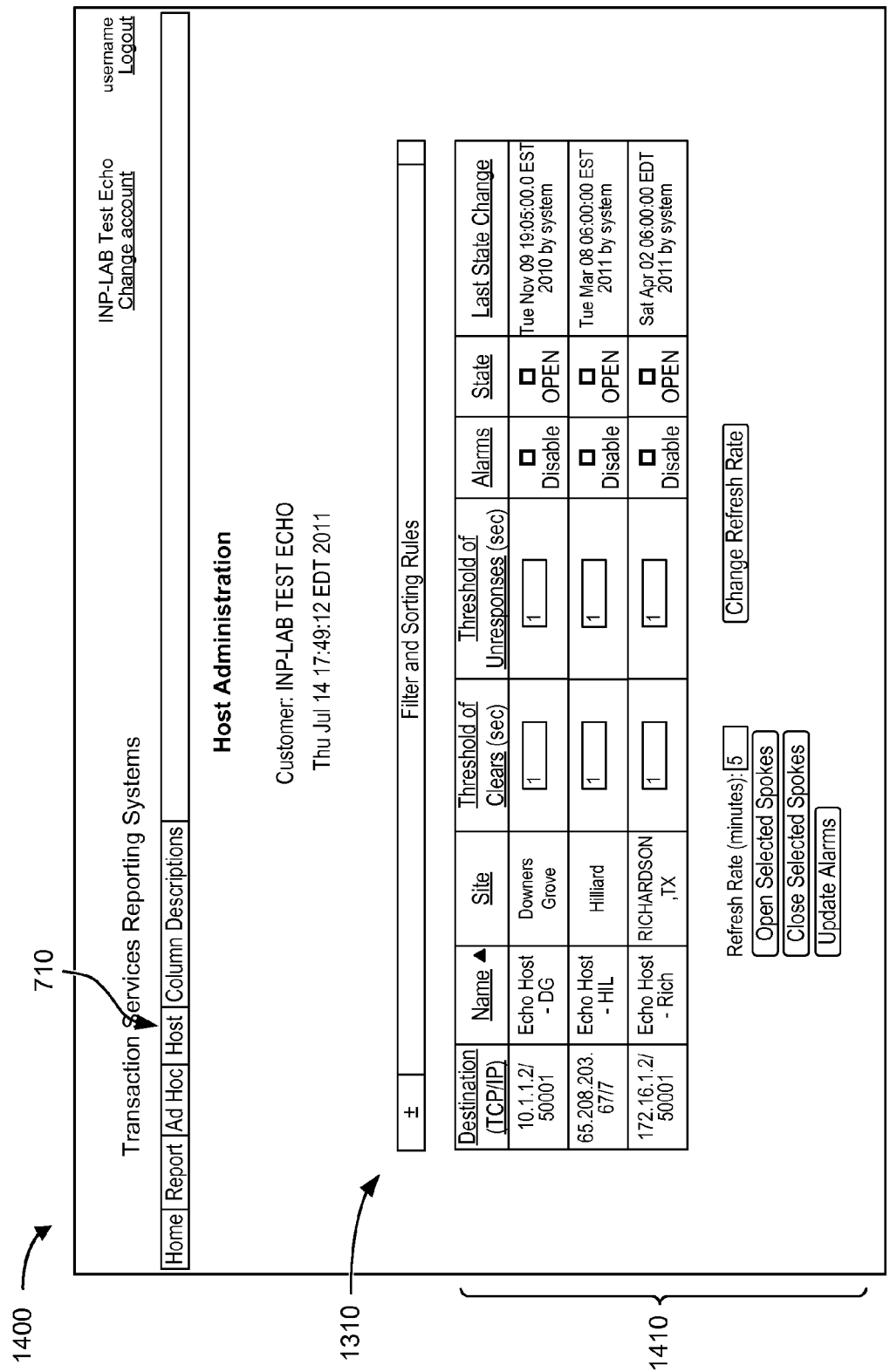
FIG. 14 is a diagram of a host administration user interface for the transaction services reporting system of FIG. 3.

Based on selection of an appropriate menu option from the host section of navigation menu 710, dashboard module 650 may generate a host dashboard administration page to provide a user with the ability to administratively shutdown and reopen access to particular hosts (e.g., payment processors 130). This shutdown/reopen option may be useful, for example, when a customer requires a host destination to be shut down for maintenance. In one implementation, selection of a shutdown may disable new transaction requests while permitting in-process requests to be completed. FIG. 14 provides a sample user interface 1400 that may correspond to a host dashboard administration page that may be generated by dashboard module 650. User interface 1400 may include navigation menu 710, filter and sorting rules section 1310, and a dashboard administration section 1410.

Dashboard administration section 1410 may provide a table of destinations with interactive options to manage alarm conditions for dashboard section 1320. Dashboard administration section 1410 may also enable a user to selectively enable/disable use of a particular host. In one implementation, the table may include a destination field (e.g., showing the IP address and port number of where the TCP connections from transaction services hub 230 terminates), a name field (e.g., the name of the destination), a site field (e.g., the geographic location of the destination), a threshold of clears field (e.g., to enter a number of clearing events that will cause an alarm to be generated for the corresponding destination if the alarm is enabled), a threshold of unresponses field (e.g., to enter a number of non-responses that will cause an alarm to be generated for the corresponding destination provided that the alarm is enabled), an alarm selection field (e.g., to activate/deactivate alarms for the corresponding destination), a state selection field (e.g., to open/shut the corresponding destination), and a last state change field (e.g., the last time when the status column was changed for the destination and who made the change).

Figure 15:
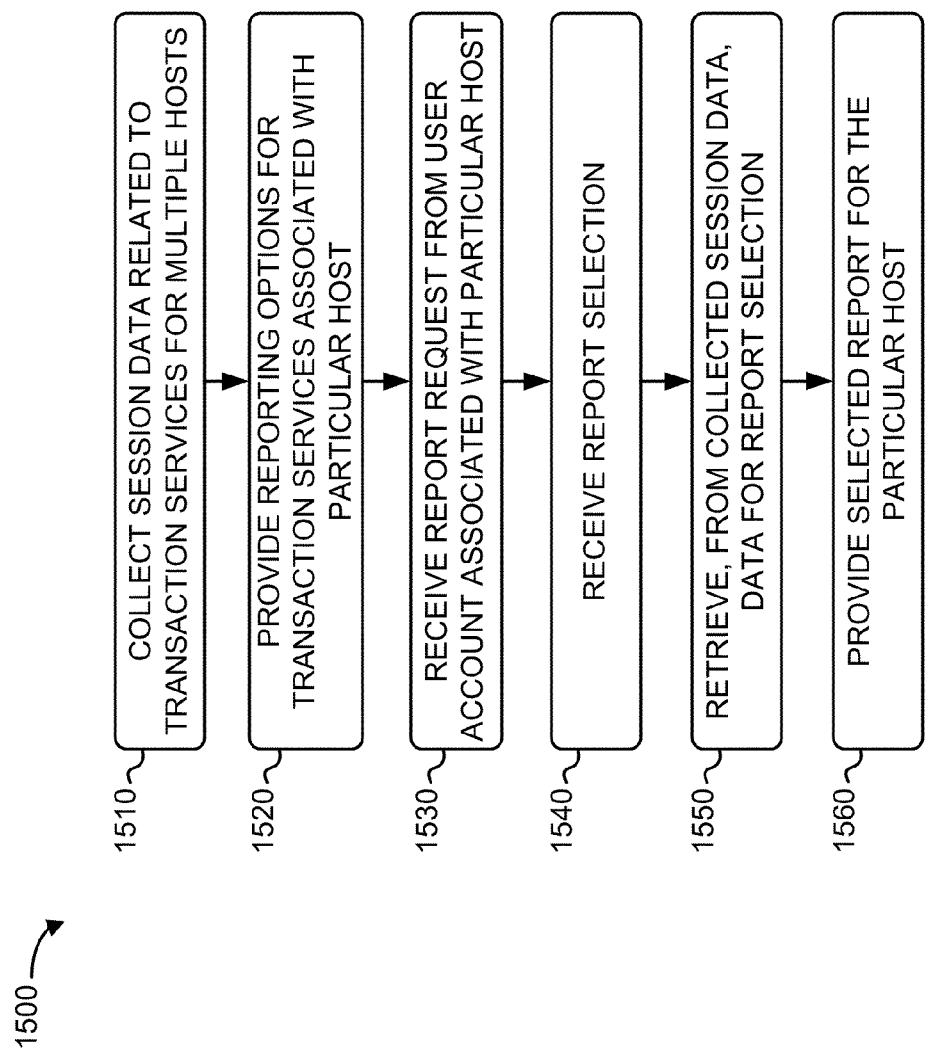
FIG. 15 is a flowchart of an exemplary process for providing transaction reporting services, according to an implementation described herein.

FIG. 15 is a flowchart of an exemplary process 1500 for providing transaction services reporting tools, according to an implementation described herein. In one implementation, process 1500 may be performed by one or more components of transaction services reporting system 320, such as one or more processing units 420. In another implementation, one or more blocks of process 1500 may be performed by one or more other devices or a group of devices including or transaction services reporting system 320.

Process 1500 may include collecting session data related to transaction services for multiple hosts (block 1510). For example, as described in connection with FIG. 3, transaction services data system 300 may log information (e.g., origination source, time, etc.) about voice network transaction requests (e.g., via voice network 205) and/or an IP network transaction requests (e.g., via 210) and send the logged information to transaction services tools system 330 and/or transaction services tools database 340. Logged information may include usage detail records; session detail records; application status records; alarm detail files; and/or log files, crash dumps, or core files from transaction services data system 300 applications.

Process 1500 may also include providing reporting options for transaction services associated with the particular host (block 1520), and receiving a report request from a user account associated with a particular host (block 1530). For example, as described above in connection with FIG. 5, based on a customer activity (e.g., logging into a secure customer account via customer portal server 245 and/or selecting an available transaction services menu option), transaction service reporting system 320 may provide a report selection menu 540 to external user device 550. Report selection menu 540 may provide an option to select and/or run standard reports. A user may select a particular report from report selection menu 540. Based on the user's selection from report selection menu 540, external user device 550 may submit a report request 550 to transaction service reporting system 320.

Process 1500 may further include receiving the report selection (block 1540) and retrieving, from the collected session data, data for the selected report (block 1550). For example, as described above in connection with FIG. 5, transaction service reporting system 320 may receive report request 550 and may retrieve data from transaction services database 340 for the requested report, as indicated by reference number 560.

Process 1500 may also include providing the selected report for the particular host (block 1560). For example, as described above in connection with FIG. 5, transaction service reporting system 320 may receive data from transaction services database 340 and may format the data into a formatted report, chart, etc. Transaction service reporting system 320 may forward the formatted data to external user device 550 as a formatted report 570.

Systems and/or methods described herein may provide transaction service reporting tools to customers of a transaction services hub. The systems and/or methods may include web-based interfaces to receive standardized reports, customized reports, and interactive dashboards of customer transactions.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 15, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. One or more network devices within a transaction services hub that maintains secure sessions with multiple payment processor devices that are associated with customers of a transaction services network, comprising:
   a memory to store a plurality of instructions; and
   a processor configured to execute the instructions in the memory to:
   receive, from transaction devices associated with a merchant and via a gateway application for one of the multiple payment processor devices, transaction authorization requests, the transaction authorization requests being provided via an ingress method using one of a group including Dialed Number Identification Service (DNIS), Hypertext Transfer Protocol Secure (HTTPS), and Secure Sockets Layer (SSL) protocol;
   route, to the one of the multiple payment processor devices and via the gateway application, the transaction authorization requests, wherein the transaction authorization requests are routed via a secure TCP/IP session between the gateway application and the one of the payment processor devices;
   log, in a database of transaction services of the customers, session data from the transaction authorization requests, the session data including an ingress field for the ingress method of the transaction authorization requests and a customer IP address for the one of the payment processor devices;
   provide, to a user device, a user interface with reporting options for transaction services associated with a particular customer of the customers, wherein the transaction services link multiple merchant devices to the one of the payment processor devices;
   receive, from the user device and via the user interface, a request for transaction services data associated with the particular customer;
   retrieve, from the database of transaction services, session data in response to the request for transaction services data associated with the particular customer, wherein the session data includes a number of transaction requests over an interval and the ingress method for each of the transaction authorization requests during the interval;
   generate, based on the request and the session data, a report for the particular customer, the report including the number of transaction requests over the interval and the ingress method for each of the transaction authorization requests; and
   send, to the user device, the report for the particular customer.

2. The one or more network devices of claim 1, wherein the user interface further includes multiple data structures that provide an overview of transaction services associated with the particular customer.

3. The one or more network devices of claim 1, wherein the user interface includes a list of available data fields from which a user may select to request a report.

4. The one or more network devices of claim 1, wherein the session data includes:
   usage detail records,
   session detail records,
   application status records, or
   alarm detail records.

5. The one or more network devices of claim 1, wherein, when retrieving session data that in response to the request for transaction services data associated with the particular customer, the processor is further configured to:
   access the database using calls to stored procedures.

6. The one or more network devices of claim 1, wherein the database of transaction services includes transaction data for transactions over a domestic toll-free voice network, an international toll-free voice network, and an Internet Protocol network.

7. The one or more network devices of claim 1, wherein the report for the particular customer includes a contracted value from a service level agreement for the particular customer and a measured performance value corresponding to the contracted value.

8. The one or more network devices of claim 1, wherein the user interface includes an interactive menu to select topics or domains for an ad hoc report for the particular customer.

9. The one or more network devices of claim 1, wherein the user interface includes an interactive menu to configure a transaction status dashboard for the particular customer.

10. The one or more network devices of claim 9, wherein the processor is further configured to:
provide a user interface to manage alarm conditions for the transaction status dashboard.

11. The one or more network devices of claim 9, wherein the processor is further configured to:
provide a user interface that enables a user to selectively enable or disable use of a particular host device.

12. A method, comprising:
receiving, by one or more network devices and from transaction devices associated with a merchant and via a gateway application for one of multiple payment processor devices, transaction authorization requests, the transaction authorization requests being provided via an ingress method using one of a group including Dialed Number Identification Service (DNIS), Hypertext Transfer Protocol Secure (HTTPS), and Secure Sockets Layer (SSL) protocol;
routing, by the one or more network devices and to the one of the multiple payment processor devices and via the gateway application, the transaction authorization requests, wherein the transaction authorization requests are routed via a secure TCP/IP session between the device gateway application and the one of the payment processor devices;
logging, by the one or more network devices and in a database, session data from the transaction authorization requests, the session data including an ingress field for the ingress method of the transaction authorization requests and a customer IP address for the one of the payment processor devices, wherein the session data is stored with transaction services data from other transaction devices and other of the multiple payment processor devices;
providing, by the one or more network devices, a user interface with reporting options for transaction services associated with a particular customer, wherein the user interface is accessible to a user device via a public network connection;
receiving, by the one or more network devices and via the user interface, a report request from a user account associated with the particular customer;
retrieving, by the one or more network devices and from the database, data responsive to the report request, wherein the session data includes a number of transaction requests over an interval and the ingress method for each of the transaction authorization requests during the interval; and
generating, by the one or more network devices and based on the report request and the data responsive to the report request, a report for the particular customer, the report including the number of transaction requests over the interval and the ingress method for each of the transaction authorization requests.

13. The method of claim 12, wherein the user interface includes multiple data structures that provide an overview of transaction services associated with the particular customer.

14. The method of claim 12, wherein the user interface includes a list of available fields and criteria that a user may select for a customized report.

15. The method of claim 12, wherein the report for the particular customer includes a contracted value from a service level agreement for the particular customer and a measured performance value corresponding to the contracted value.

16. The method of claim 12, wherein retrieving data responsive to the report request includes generating one or more calls to stored procedures within a transaction services database.

17. The method of claim 12, wherein the transaction services include transactions over a domestic toll-free voice network, an international toll-free voice network, and an Internet Protocol network.

18. A non-transitory computer-readable medium, comprising computer-executable instructions, for causing one or more processors of data network devices executing the computer-executable instructions to:
receive, from transaction devices associated with a merchant and via a gateway application for one of multiple payment processor devices, transaction authorization requests, the transaction authorization requests being provided via an ingress method using one of a group including Dialed Number Identification Service (DNIS), Hypertext Transfer Protocol Secure (HTTPS), and Secure Sockets Layer (SSL) protocol;
route, to the one of the multiple payment processor devices and via the gateway application, the transaction authorization requests, wherein the transaction authorization requests are routed via a secure TCP/IP session between the gateway application and the one of the payment processor devices;
log, in a database of transaction services of multiple customers, session data from the transaction authorization requests, the session data including an ingress field for the ingress method of the transaction authorization requests and a customer IP address for the one of the payment processor devices;
retrieve, from the database of transaction services of the multiple customers, session data associated with a particular customer, wherein the transaction services link multiple merchant devices to the particular customer;
provide, to a user device, a user interface including reporting options for transaction services associated with a particular customer of the customers, wherein the transaction services link multiple merchant devices to the one of the payment processor devices;
receive, from the user device and via the user interface, a request for transaction services data associated with the particular customer;
retrieve, from the database of transaction services, session data in response to the request for transaction services data associated with the particular customer, wherein the session data includes a number of transaction requests over an interval and the ingress method for each of the transaction authorization requests during the interval; and
generate, based on the request and the session data, a report for the particular customer, the report including the number of transaction requests over the interval and the ingress method for each of the transaction authorization requests.

19. The computer-readable medium of claim 18, further comprising computer-executable instructions, for causing one or more processors executing the computer-executable instructions to:

generate, based on the session data associated with the particular customer, a report including a contracted value from a service level agreement for the particular customer and a measured performance value corresponding to the contracted value.

20. The computer-readable medium of claim 18, further comprising computer-executable instructions, for causing one or more processors executing the computer-executable instructions to:
generate, based on the session data associated with the particular customer, an interactive menu to select topics or domains for an ad hoc report for the particular customer.

\* \* \* \* \*